US011593415B1

(12) United States Patent
Anderson et al.

(10) Patent No.: US 11,593,415 B1
(45) Date of Patent: Feb. 28, 2023

(54) DECISION MAKING ANALYSIS ENGINE

(71) Applicant: Validate Me LLC, Stamford, CT (US)

(72) Inventors: James Anderson, Morris Plains, NJ (US); Thomas J. Saleh, Stamford, CT (US); Lawrence C. Rafsky, Juniper, FL (US)

(73) Assignee: VALIDATE ME LLC, Stamford, CT (US)

( * ) Notice: Subject to any disclaimer, the term of this patent is extended or adjusted under 35 U.S.C. 154(b) by 0 days.

(21) Appl. No.: 17/674,945

(22) Filed: Feb. 18, 2022

Related U.S. Application Data

(63) Continuation-in-part of application No. 17/519,634, filed on Nov. 5, 2021.

(51) Int. Cl.
*G06F 16/332* (2019.01)
*G06F 16/33* (2019.01)
*G06N 20/00* (2019.01)

(52) U.S. Cl.
CPC ...... *G06F 16/3329* (2019.01); *G06F 16/3326* (2019.01); *G06F 16/3334* (2019.01); *G06N 20/00* (2019.01)

(58) Field of Classification Search
CPC ............. G06F 16/3329; G06F 16/3326; G06F 16/3334; G06N 20/00
See application file for complete search history.

(56) References Cited

U.S. PATENT DOCUMENTS 8,868,590 B1 * 10/2014 Donneau-Golencer ...................... G06F 16/24578 707/765
9,190,056 B2 * 11/2015 Zhu .......................... G10L 15/22
10,074,381 B1 * 9/2018 Cowburn ................. G06F 40/58
10,303,746 B1 * 5/2019 Periasamy ................ G09F 1/00
10,467,344 B1 * 11/2019 Jade ....................... G06F 40/205
10,628,483 B1 * 4/2020 Rao ........................ G06F 16/683
10,810,357 B1 * 10/2020 Tsypliaev .............. G06F 3/0484
11,010,535 B1 * 5/2021 Periasamy ............ G06F 40/151
11,347,752 B2 * 5/2022 Wheeler ........... G06F 16/24578

(Continued)

OTHER PUBLICATIONS

"Natural Language Processing for Online Applications; text retrieval, extraction and categorization." Jackson/Moulinier(c) 2002 ISBN 902724989.

(Continued)

*Primary Examiner* — Aravind K Moorthy
(74) *Attorney, Agent, or Firm* — Gugliotta & Gugliotta, LPA

(57) ABSTRACT

The automated collection of online data is enhanced by generating and saving a context between a document and a related named entity, as well as a credibility level of the online source. The context, credibility level, and quality and quantity of collected data are used to enhance the use of the collected data in automated decision-making. Both the quality and the quantity may be continuously updated and honed through machine learning. Three new algorithms—DUPES, CORRAL, and ONTO—have been introduced to support the above, improving current state-of-the-art engineering practice by sharpening the strategy for named-entity searching, for ensuring that topic modeling produces relevant topic tags, and for handling sentiment which may be NEGATIVE, POSITIVE, and NEUTRAL (which includes MISSING and INCONCLUSIVE).

4 Claims, 5 Drawing Sheets

(56) References Cited

U.S. PATENT DOCUMENTS

| | | | |
|---|---|---|---|
| 11,368,697 B1* | 6/2022 | Man | H04N 19/154 |
| 2002/0198866 A1* | 12/2002 | Kraft | G06F 16/951 |
| 2003/0036944 A1* | 2/2003 | Lesandrini | G06Q 30/0273 |
| | | | 705/7.29 |
| 2006/0047691 A1* | 3/2006 | Humphreys | G06F 40/295 |
| | | | 707/999.102 |
| 2006/0064394 A1* | 3/2006 | Dettinger | G06F 16/955 |
| | | | 707/E17.112 |
| 2006/0224383 A1* | 10/2006 | Lee | G10L 15/1815 |
| | | | 704/E15.024 |
| 2007/0294203 A1* | 12/2007 | Seitz | G06F 16/9038 |
| 2008/0175243 A1* | 7/2008 | Bhagwan | G06F 16/951 |
| | | | 370/392 |
| 2008/0249991 A1* | 10/2008 | Valz | G06F 16/9535 |
| 2009/0240683 A1* | 9/2009 | Lazier | G06F 16/3325 |
| | | | 707/999.005 |
| 2009/0292693 A1* | 11/2009 | Yang | G06F 16/3338 |
| | | | 707/999.005 |
| 2009/0327043 A1* | 12/2009 | Sekhon | G06Q 30/0217 |
| | | | 705/14.19 |
| 2011/0173177 A1* | 7/2011 | Junqueira | G06F 16/951 |
| | | | 707/706 |
| 2011/0246181 A1* | 10/2011 | Liang | G06F 16/3344 |
| | | | 704/9 |
| 2014/0153715 A1* | 6/2014 | Georgiev | G06F 21/64 |
| | | | 380/28 |
| 2015/0088511 A1* | 3/2015 | Bharadwaj | G06F 40/295 |
| | | | 704/244 |
| 2015/0348565 A1* | 12/2015 | Rhoten | G06F 16/243 |
| | | | 704/270.1 |
| 2016/0042061 A1* | 2/2016 | Sengupta | G06F 40/30 |
| | | | 707/738 |
| 2016/0055838 A1* | 2/2016 | Serletic, II | G10L 25/48 |
| | | | 704/260 |
| 2016/0336008 A1* | 11/2016 | Menezes | G06F 40/295 |
| 2017/0011068 A1* | 1/2017 | Vashishtha | G06F 16/9535 |
| 2017/0052937 A1* | 2/2017 | Sirven | G06F 40/295 |
| 2017/0052982 A1* | 2/2017 | Sirven | G06F 16/5866 |
| 2017/0116191 A1* | 4/2017 | Li | G06F 16/93 |
| 2017/0178045 A1* | 6/2017 | Wasik | G06Q 10/06393 |
| 2017/0199875 A1* | 7/2017 | Nevrekar | G06F 16/9032 |
| 2017/0215126 A1* | 7/2017 | Moisanen | H04W 48/08 |
| 2017/0331909 A1* | 11/2017 | Iadonisi | G06Q 10/107 |
| 2017/0364967 A1* | 12/2017 | Parikh | G06N 20/00 |
| 2018/0268792 A1* | 9/2018 | Serletic | G10H 1/0025 |
| 2018/0285326 A1* | 10/2018 | Goyal | G06F 16/288 |
| 2019/0034963 A1* | 1/2019 | George | H04L 67/535 |
| 2019/0073365 A1* | 3/2019 | Jamshidi | G06F 16/986 |
| 2019/0147838 A1* | 5/2019 | Serletic, II | G10L 25/57 |
| | | | 704/260 |
| 2019/0156923 A1* | 5/2019 | Kain | G06F 16/958 |
| 2019/0304578 A1* | 10/2019 | Kain | G06N 20/00 |
| 2019/0312939 A1* | 10/2019 | Noble | G06F 21/602 |
| 2020/0035341 A1* | 1/2020 | Kain | G16H 10/20 |
| 2020/0050638 A1* | 2/2020 | Hancock | G06F 16/90344 |
| 2020/0081980 A1* | 3/2020 | Eisenberg | G06F 40/30 |
| 2020/0082299 A1* | 3/2020 | Vasconcelos | G06N 20/00 |
| 2020/0105365 A1* | 4/2020 | Glode | G06F 3/0482 |
| 2020/0111188 A1* | 4/2020 | McCallum | G06F 3/0482 |
| 2020/0111379 A1* | 4/2020 | Cui | G06Q 50/205 |
| 2020/0151389 A1* | 5/2020 | Murphy | G06F 40/30 |
| 2020/0184278 A1* | 6/2020 | Zadeh | G06K 9/6264 |
| 2020/0210693 A1* | 7/2020 | Scanlan | G06Q 10/101 |
| 2020/0272129 A1* | 8/2020 | Crothers | G05B 19/4099 |
| 2020/0320518 A1* | 10/2020 | Simas | H04L 51/52 |
| 2020/0364404 A1* | 11/2020 | Priestas | G06F 16/93 |
| 2021/0035132 A1* | 2/2021 | Kopikare | G06Q 30/0203 |
| 2021/0135876 A1* | 5/2021 | Adibi | G06Q 30/016 |
| 2021/0151042 A1* | 5/2021 | Park | G10L 15/197 |
| 2021/0294969 A1* | 9/2021 | Viswanathan | G06F 16/93 |
| 2021/0312282 A1* | 10/2021 | Hernandez Leal | G06N 3/04 |
| 2021/0357778 A1* | 11/2021 | Vrouwenvelder | G06N 5/04 |
| 2021/0390263 A1* | 12/2021 | Ricketts | G06F 40/30 |
| 2021/0406383 A1* | 12/2021 | Ahuja | G06F 21/577 |
| 2022/0198319 A1* | 6/2022 | Singh | G06N 20/00 |

OTHER PUBLICATIONS

NIST—The Retrieval Group of the Information Access Division; http://www-nlpir.nist.gov/.

https://siteefy.com/how-many-websites-are-there.

Koloveas, P.; Chantzios, T.; Alevizopoulou, S.; Skiadopoulos, S.; Tryfonopoulos, C. InTime: A Machine Learning-Based Framework for Gathering and Leveraging Web Data to Cyber-Threat Intelligence.

Eibe Frank, E.; Hall, M A. "Simple Approach to Ordinal Classification" ECML 2001, LNAI 2167, pp. 145-156 (2001).

Rafsky, L. ; Burdulia, B.; Saleh, C. "A New Machine Learning Nested-Dichotomy Predictive Analytic Framework for Neutral-Rooted Ordinal Data".

* cited by examiner

Flowchart of Frank-Hall: Two Trees

Flowchart of Rafsky-Burdulia-Saleh: One Tree

Flowchart of ONTO: One Tree

DECISION MAKING ANALYSIS ENGINE

RELATED APPLICATIONS

The present invention is a Continuation in Part of U.S. Ser. No. 17/519,634, filed on Nov. 5, 2021 and incorporated by reference as if fully rewritten herein.

BACKGROUND OF THE INVENTION

1. Field of the Invention

The present invention relates generally to information retrieval and data classification and, more particularly, to a system for enhanced data source collection using intelligent gathering techniques centered on data to use in support of identity management.

2. Description of the Prior Art

Identity management solutions exist that are generally designed to facilitate the management of digital identities and operations such as authentication in real-world application. The current state-of-the-art centers on mechanisms for ID verification that involve two participants, with an optional third participant(s), where the entity whose ID is to be verified is done so by presenting for review and investigation various credentials, facts, and (optionally) supplied replies to various questions and meets various challenges, along with implicitly or explicitly allowing (i) various aspects of their personal transactional and/or behavioral history to be analyzed, and (ii) various aspects of their personal biometrics to be gathered and analyzed.

However, limitations in the current systems are based mostly on the quantity of credentials and facts to be collected and reviewed, and less upon any understanding of the quality of the reviewed and collected data and information.

Consequently, a need exist for improved system for analysis and understanding of publicly available information used in identity verification and other decision making analysis.

The present invention concerns using information, gleaned from the World Wide Web, to assess the trustworthiness of individuals and organizations vis-à-vis their claimed identities, determining the probability that these identities are not valid (i.e., they are fake or stolen), or that, even if valid, they are being used to initiate a fraudulent transaction. We make such assessments in response to a query submitted to us by the counterparty to the transaction, the party who needs to rely on the identity, not the individual or organization proffering it.

Why are we using the World Wide Web? Because, as everyone surely knows, the World Wide Web (hereafter, simply "the Web") makes a wealth of information available. This information is accessed via various interfaces collectively known as "Web Sites" (typically HTML pages served up via Web Servers and retrieved via Web Browsers or automated software systems that imitate Web Browsers, but also via user-initiated file downloads in various formats, RSS servers, FTP servers, proprietary or industry-standard APIs, and other access methods—manual and/or automated—both sanctioned by the information provider, and not-necessarily-sanctioned, like screen captures, plus "always-on" channels of information [often featuring both user-generated and professional-editorial content] from social-media outlets, blogs, news services, query-and-comment services, discussion-groups, podcasts, video/audio/text pushes, and other broadcast-type or push-type feeds).

The process is often not straight-forward, since there are many types of Web Sites (and other Web-based channels as outlined above) allowing different degrees of open or restricted access:

Public;

Sign-in (free) required but available to all;

Subscription (not free) sign-in required but available to all who are willing to pay the required subscription fee (note: often a web source will offer both Sign-in and Subscription services, leaving the choice to the user whether the user is willing to pay the fee and thereby get ["unlock"] additional information via a "premium" service);

Private (sign-in restricted to a pre-determined audience);

Semi-Private (access restricted to an audience based on certain criteria, but the process for joining that audience is open and straight-forward, e.g., specify that you are 21-or-over and a resident of the U.S.); and Hidden (aka "Dark").

This access problem is further compounded by the fact that there are over current 200 Million active Web sites (out of a total of more than 1 Billion web sites and increasing),[1] which is why many information seekers have to use comprehensive search engines like Google® or Bing® to find the specific data they are interested in. Of note, such "comprehensive" search engines do not access "Dark" Web Sites are hidden from such search engines).

[1] See IDS Cite No. CC

Yet there is a deeper problem. A good deal of information on the Web is polluted, damaged perhaps irrevocably, by the Seven Deadly Sins—the Seven D's of Data Damage (as we have named them. Data on the Web can be, unfortunately:

1. Diffuse—The needed data might be spread over several web sites or channels, and perhaps not well-shared, described, or cross-referenced. Bankruptcy records, for example, may be found on federal, state, and private (media and/or business research) sites
2. Duplicative—Web sites and channels copy from one another often without attribution, and sometimes with the introduction of errors, and therefore it is not clear what is and what is not affirmation or data consistency/cross-checks.
3. Diverse—Many different opinions can be expressed across multiple Web sites and channels, either directly or through differing data analyses. For example, do rising interest rates imply more or fewer consumer bankruptcies? Conclusions vary widely and are often mutually exclusive.
4. Decorated—Web sites and channels embed advertisements, links to other articles, photos and images of various sorts that might not carry much information, and so on, to make pages more visually attractive, along with font changes, layout tables, and whatnot. These can obscure the actual information required, especially when the Web source is being accessed by a software program, an automaton, and not a human user.
5. Delusional—It is a fact of life that even honest, well-meaning providers of content on the Web can make things up, can believe things that are not true, and present nonsense as facts. There can also be bigotry, bias, and discrimination forces at work. Example: it is widely quoted on the Web that young Black males are 50% more likely than young White males to commit credit-card fraud. This underlying fact is objectively false.

6. Deceptive—Creators of Web content can be too-slick-by-half in an attempt to "win people over", jostle them into making a purchase or a donation, etc. While not outright lying, these practices are at best misleading. An article on consumer bankruptcy by an attorney might carry a statement that "our firm does not charge you for bankruptcy work", failing to mention that you will be charged (an exorbitant amount) for "filing fees and processing" (re-using an old trick perfected by some car dealers). Similarly, an often-unreliable construction company might bury bad reviews by having his (very) few satisfied customers post glowing testimonials over-and-over, by changing his company name, etc. Not strictly dishonest, but deceptive for sure.

7. Dishonest—The next step beyond "Deceptive" is to knowingly lie. A fraudulent home construction contractor might simply create a fake Web site or Facebook presence and post made-up reviews.

What is the appropriate information-engineering strategy when faced with these issues? The state-of-the-art at present is to use AI ("Artificial Intelligence") in prescribed ways to defeat the Seven D's.

The current techniques employed by experienced, expert engineers in Web knowledge acquisition and information-engineering management in today's environment focus on NLP ("Natural Language Processing"), especially:

1. Search—for Web Sites and specific Web Site pages (or following a "whitelist" of Web Sites and pages to visit, previously prepared), plus lists of other Web information-sources/channels to access, typically focusing on those search results that pertain to the topics and entities of interest, followed by, for each such page or information item retrieved:

2. Segmentation—breaking up the web page or text block into its constituent pieces, typically by detailed (automated) analysis of the HTML (or other mark-up systems) that defines the page, to facilitate the next steps, 3 through 8, which implement successful "scraping" of Web information, augmented or enriched with appropriate labels ("tags"), each step a (well-known) standard AI/NLP technique, as follows.

3. De-Chroming—removing advertisements, irrelevant images, etc. from the text.

4. Spidering/Crawling—finding links on the page to other pages (internal at the same site, or on other external sites and sources), and then visiting them to do the same process.

5. Topic Modeling and Categorization—via the analysis of keywords, phrases, and other word-use and word-order properties (especially by comparison with the language features found in previously-studied large collections of text) figuring out, referencing and assigning standardized labels, classification schemes, and category names, what the information is "about", and then checking as needed if the topic(s) uncovered truly match those (if any) that were searched for in Step 1.

6. NER—"Named Entity Recognition"—extracting and identifying names of people, organizations, locations, and similar "proper nouns" so that the entities the information pertains to is properly isolated, and then checking as needed if these entities match those (if any) that were searched for in Step 1.

7. Sentiment Analysis—Deciding if the information extracted is positive, negative, or neutral with regards to the topic/topics and entity/entities discussed in the text. And if neutral, decide whether or not to discard as irrelevant.

8. Semantic Role Labeling plus Concept Indexing; Data Sharing/Understanding; Storing in Standard Forms; Knowledge Maps/Graphs/Relationships—summarizing and storing in machine-readable form (and often in addition constructing human-readable displays) the information on topics, entities, and sentiments assembled, and additionally exposing the relationships between and among the information items (sometimes called "tags-to-triples").

However, because of heretofore unrecognized technical gaps in the 8-step approach described above, this current-best-engineering, industry-standard, at-present-state-of-the-art series of steps cannot adequately solve the problem, a need exists for improvements to overcome flaws in Steps 1 (Search), 5 (Topic Modeling), and 7 (Sentiment Analysis).

SUMMARY OF THE INVENTION

It is thus an object of the present invention to provide a system and method for qualitatively enhancing the review of collected data and information used in digital decision-making processes.

It is a feature of the present invention data classification system targeting a specific reference to utilized techniques from Natural Language Processing to understand why entities are named within a data source, what relevance exists to the assigned reference area, following the DUPES algorithm described below to control the choice for named entities being searched.

According to the present invention, improvements are provided to overcome unrecognized technical gaps in the 8-step approach by correction of flaws in Steps 1 (Search), 5 (Topic Modeling), and 7 (Sentiment Analysis).

According to one aspect of the present invention, flaws in the current method of Search are corrected. Because there are world-wide approximately 8 Billion individuals and 400 Million organizations, it is currently not feasible to run Web searches on each and all of them, even if all the names could somehow be collected. Similarly, it is not beneficial in general to merely wait until a name is presented for identity verification to do the necessary Web search to assemble relevant information, since "trust" answers should in most cases be computed in real-time. Of course there will always be some names presented for which we will not have done a prior search, and those trust answers will not be returned as quickly as we would like, but according to the present invention a great many of the searches may be performed in advance. Advanced searches do not need to be done by searching through huge lists of names, but rather by employing a novel computing engine that we call DUPES (for turning people trying to dupe others into dupes themselves)—DoUble Pump Extract & Shift. Such a method may be done as follows: instead of searching for a name, a search of the Web for specific instances (actual real-world events following specific well-known patterns) of identity abuse is performed, as would (for example) be discussed in a local newspaper. From the retrieved information if a real person is identified, search biasing of the selection is directed towards uniqueness of names, availability of ancillary information on the person, etc. This is not the single person we are interested in (although we do add that person to our master list), but we do anyway a comprehensive Web search on that person and assemble a template of events and descriptions about them—recent divorce, bankruptcy, arrest, civil suit, and so on. We then, having extracted the basic facts on these events, do a search on abstract (non-personalized) versions of those facts (this is the "double pump"), and collect all the person-names (and associated information) from real-events resembling the abstract ones as well as any actual reported identity abuse. Note we are shifting person, events, and time—that is the essence.

The process continues, expands, and never stops. Our catalog of names of possible identity abusers continues to grow, all without collecting or storing any personal information supplied by anyone named.

Using such a technique tremendous advantages are realized in responding to a query regarding any particular person's trustworthiness. Presence or absence of the name on a master list is fuel for further analysis. Of course, we also track any follow-ups to such queries, and if in fact there is a fraud (that has been stopped) this data is further used in a machine learning system to enhance how we run DUPES.

According to another aspect of the present invention, flaws in the current method of Topic Modeling are corrected. Current best-practices topic-modeling techniques used in the analysis of text, and in particular, Web sources of all types, is to analyze words-and-phrases that appear in common across subsets of content, but not with equal frequency across all content, thus pinpointing the content subsets pertaining to specific topics of interest. For example, "bankruptcy" will appear frequently in content about consumer and business credit and payment problems, but nowhere near as frequently across all news pertaining to personal and organizational finances.

This has proven helpful in many types of content analysis, but our invention is specifically designed to circumvent a problem which has not been widely recognized and is not addressed in current practice: words-and-phrases reflect correlation between language and action, but for our purposes of identity verification aimed at spotting the possibility of fraud, we need causation, not correlation, which any statistician will tell you are not at all the same thing.

For example, compare the following two gossip-posts from a social media site:

"Bob is having a horrible time managing his finances—he is torn between upgrading his vacation home or renovating his garage to hold even more cars. Lucky for him his dad is in the construction business, does good stuff, and can help Bob with the work."

Versus:

"Bob is having a horrible time managing his finances—he is likely going to lose his home and car. Lucky for him his dad is in construction, the business is doing good, and can help Bob work this out."

Any improved technique needs to understand that in the second case Bob is facing circumstances that might induce him to defraud a creditor, but that is certainly not the case with the first post.

To solve this problem the present invention provides a technique referred to as CORRAL—CORrelate Relationship with Actual Loss. CORRAL works by inverting the process used in current-practice topic modeling. Instead of retrieving (large amounts) of text, and then assigning topics (either by recognizing similarities automatically, known as "Unsupervised" learning, or by having humans label text with topic names [sometimes pre-determined], known as "Supervised" learning), our engineering begins with a large database of known fraud cases, assembled from real corporate records across many commercial entities, complete with names (which is how the CORRAL algorithm differs from the DUPES algorithm), and then does traditional searching of Web channels to find text that matches the names and concepts in each fraud case record. The retrieved texts are then easily separated into "true causal potential" or "irrelevant" bins, based on an additional processing step (similar to DUPES) constructed by eliminating the specific proper nouns (using standard NER techniques) referring to actual persons, organization, and places, doing additional Web searches on this reduced text, and checking that the results of the elimination/search have matches in our database of specifics as used in DUPES.

In the example prevented, the algorithm learns that the words {upgrade, vacation, renovating, construction} tilt away from text being predictive of potential identity fraud problems, while the term {lose} tilts toward it, and learns further that the phrase "horrible time managing . . . finances" can be an irrelevant red herring.

According to another aspect of the present invention, flaws in the current method of Sentiment Analysis are corrected. Continuing with gossip-type posts from social media, we can illustrate the problem inherent in today's state-of-the-art sentiment analysis techniques: these techniques have difficulty differentiating between truly negative or positive sentiment, and expressions that are actually neutral. Consider:

"Bob had a terrible look about him at Alice's party—too much to drink, tight suit from gaining weight, bad hair. What the hell happened to him"

Versus

"It's a shame the hell Bob is going thru—at Alice's party, the effects of his treatments on his looks were obvious and terrible . . . weight loss, hair loss, etc."

The CORRAL algorithm here is not enough, since drinking problems can certainly be thought as an indicative predictor of a possible proclivity to commit financial fraud. Supervised-learning techniques can differentiate between irrelevant sentiment and important sentiment, but not if the sentiment engine can only choose NEGATIVE or POSITIVE, as is the case with many engines.

It has been recognized by practitioners of sentiment analysis for some time that forcing a choice of POSITIVE or NEGATIVE is a mistake—NEUTRAL is needed a well. But there is an engineering problem here:

Machine Learning techniques perform best when asked to choose between only two alternatives ("binary classification")—like {NEGATIVE, POSITIVE}, usually encoded {−1, 1};

And even those techniques that choose between three alternatives do not typically work well when the alternatives are ordered, like {NEGATIVE, NEUTRAL, POSITIVE}, usually encoded {−1, 0, 1}.

This problem was solved in researchers Frank and Hall[2] as shown in conjunction with FIG. 1. As illustrated in the example flowchart of the PRIOR ART the method converts the {−1, 0, 1} problem into two binary classification problems. This was updated by researchers Rafsky, Burdulia, and Saleh[3] in which the Frank-Hall approach was modified to employ only one binary classification, not two. As shown in FIG. 2 which illustrates the PRIOR ART (as in the original paper) a more complex {−2, −1, 0, 1, 2} sentiment analysis.

[2] See IDS Cite No. EE

[3] See IDS Cite No. FF

The present solution of the present invention is based on this Rafsky-Burdulia-Saleh method, with two key modifications:

1. We simplify to the {−1, 1} sentiment result; and
2. We specifically only try to separate the NEUTRAL from the EITHER POSITIVE OR NEGATIVE sentiment.

The result is referred to as result ONTO—ONe Tree Only, as shown in conjunction with FIG. 3.

This second of these points is an important piece of engineering in the current invention. For the informational purposes of identification and then prediction, we must deliberately conflate POSITIVE and NEGATIVE text items (including text extracted from audio/video), as long as we separate these important cases from the NEUTRAL.

To understand this, consider this item from a local newspaper:

"Bob's family rejoiced, smiling and grinning widely while looking on, as Bob was released from prison after his three-year sentence for credit-card fraud."

This is important text, and while expressing a positive (good) sentiment, indicates a negative condition for our purposes.

To be successful implementing the DUPES, CORRAL and ONTO algorithms, the present invention, as described in greater detail below, may embed the operation of these algorithms into a fully reliable, scalable, and monitored architecture, using modern deployment and distributed-server methodologies.

Briefly described according to the preferred embodiment of the present invention, a data engine is provided for building structured search bodies keyed on entity names throughout the data sources. Existing data gathering techniques are utilized and then augmented with an enhancement in the 'understanding' of the collected documents using language processing, entity and event recognition and entity interrelationship analysis, following the approach of the CORRAL algorithm described above. Using Machine Learning technologies, collected data is enhanced by the growth of the collected data, as well as enhancements in the understanding of its accuracy and relevancy in reference to a particular decision process such as, for example, identity verification for an online commercial transaction. An information retrieval engine interfaces with an end user to collect and analyze information requests. The system administration directly interfaces with the information retrieval, and can direct the data collection crawler specifically for each data source after providing a starting link and a searching scope, as well as monitoring the process and collection activities in real time.

The present invention acts as an information enhancement engine to aid in decision making processes utilizing collected digital information. In the context of a required data based determination, collected information is understood in terms of context and quality in order to enhance subsequent validation, verification and trusted confidence values of an entity (an individual person or organization) for each type and level of identification needed.

Further, no end user direct interaction occurs with the managed data collection.

Further still, sentiment analysis is performed following the approach of the ONTO algorithm, to determine the polarity of the information, providing necessary evidence suggesting a high or low trust score for the identity of the entity in need of such identity verification.

Further objects, features, elements, and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
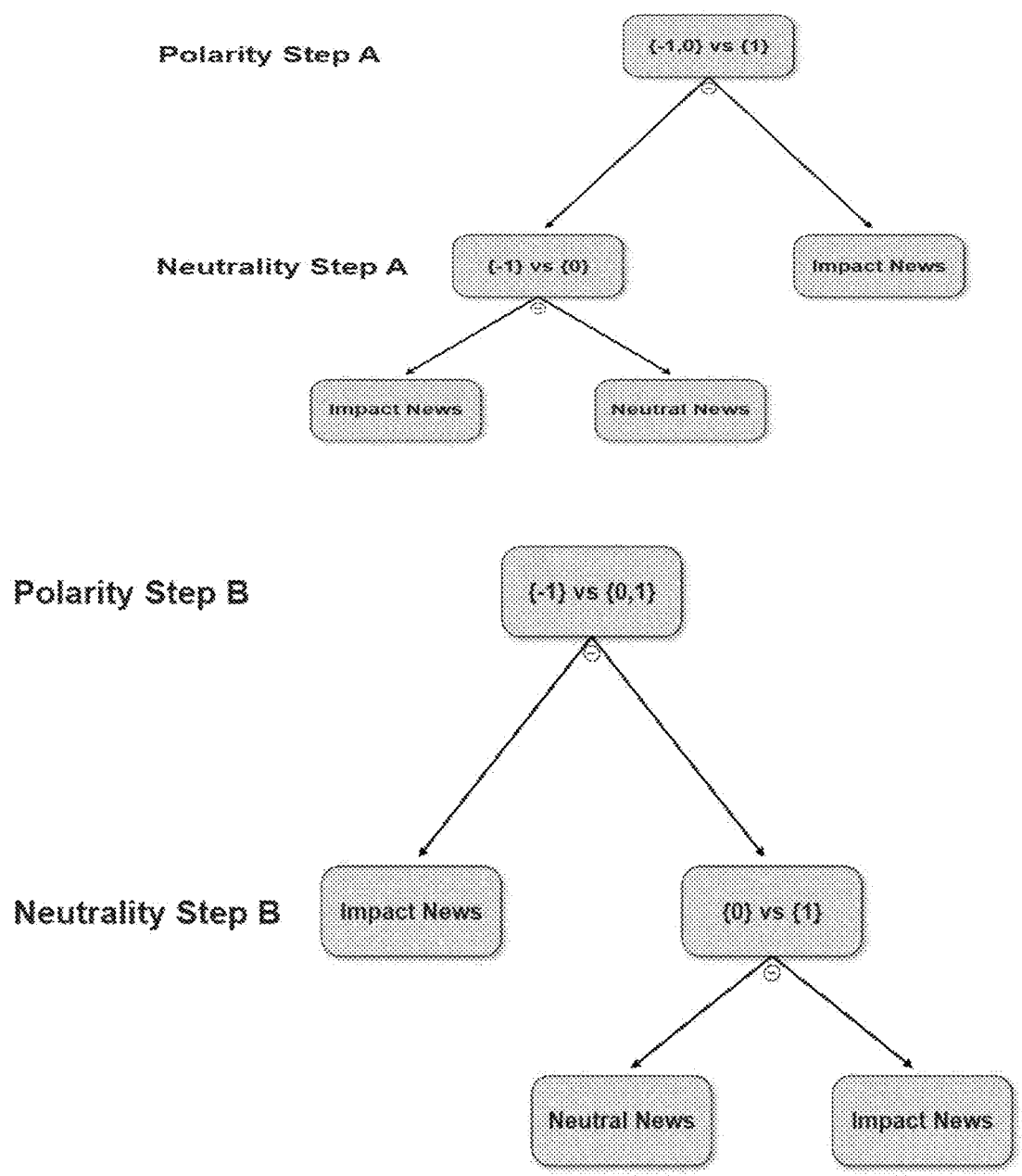
FIG. 1 is a flowchart of a Frank-Hall Two Trees example of a method for converting the $\{-1, 0, 1\}$ problem into two binary classification problems according to the PRIOR ART.
Figure 2:
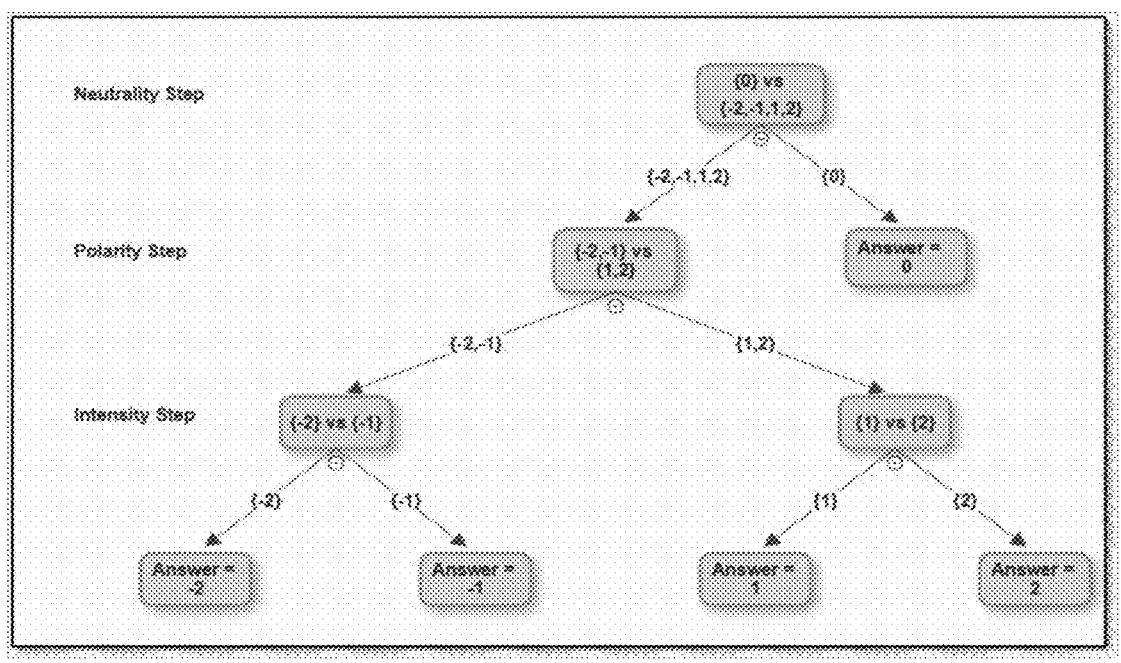
FIG. 2 is a flowchart of a Raftky-Burdulia-Salheh One Tree example of a more complex $\{-2, -1, 0, 1, 2\}$ sentiment analysis according to the PRIOR ART.
Figure 3:
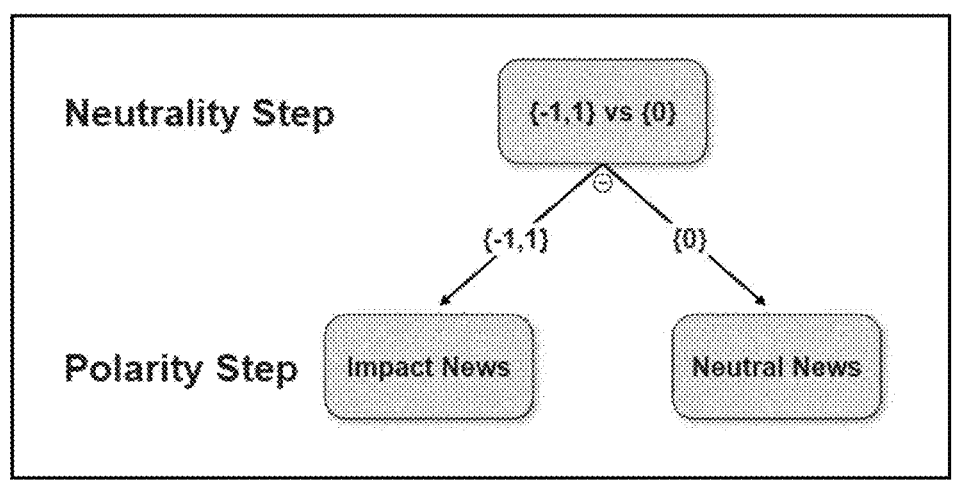
FIG. 3 is a flowchart of an ONTO—ONe Tree Only analysis according to the preferred embodiment of the present invention.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, a decision making analysis engine, generally noted as 10, is shown according to a preferred embodiment of the present invention. The analysis engine 10 is divided generally into six (6) main functional areas: information retrieval (FIG. 4); central processing manager 40; data storage 42; external data source gateways 60; customer informational retrieval 70; and predictive risk analysis 40. Common functions shared with all of these areas include: access control list (ACL); authentication; schedule; notification; logging; error trapping; data access layer; and auditing.

Figure 4:
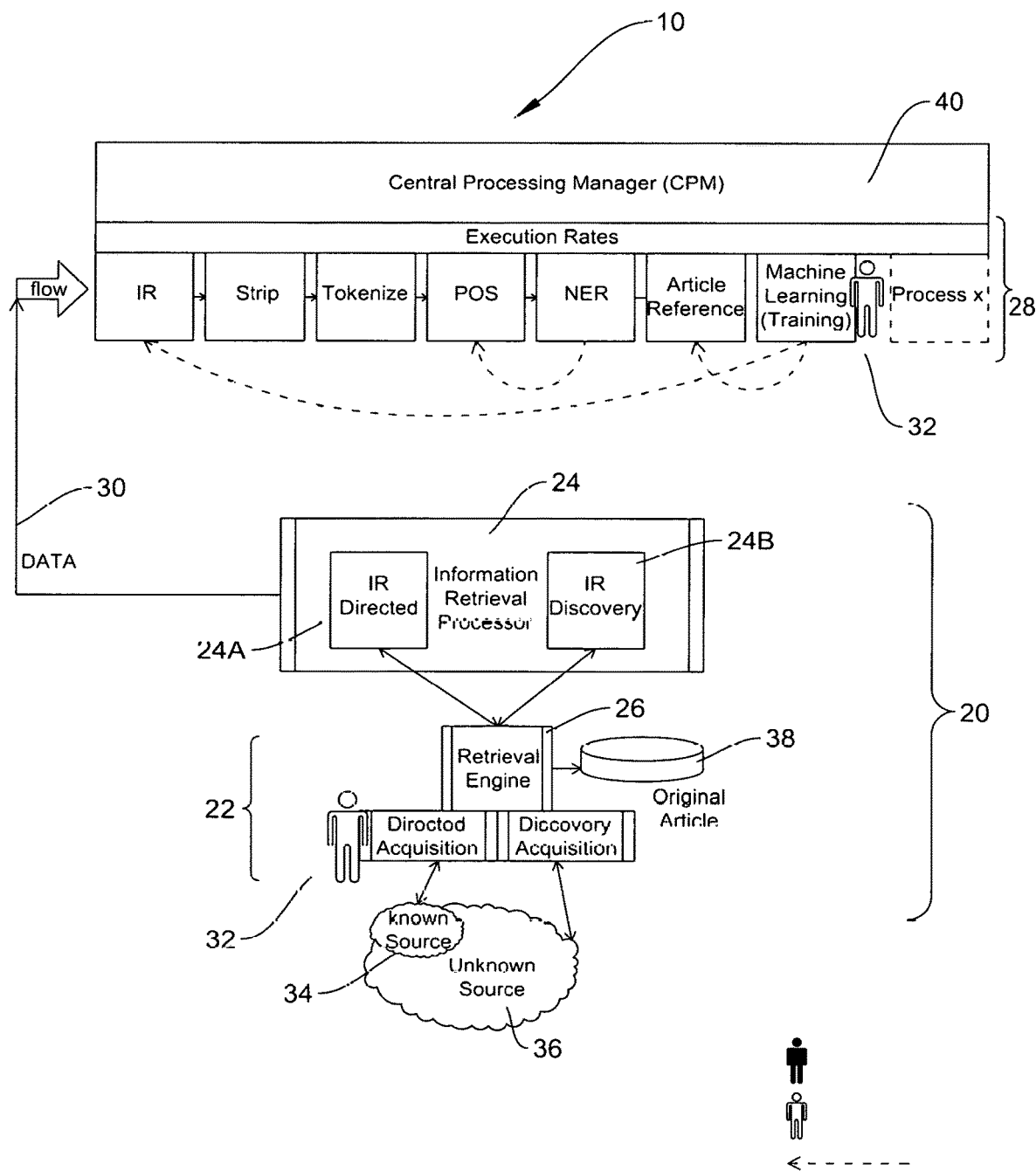
FIG. 4 is a schematic showing, generally, an information retrieval system for use with a decision-making analysis engine according to a preferred embodiment of the present invention.
Figure 5:
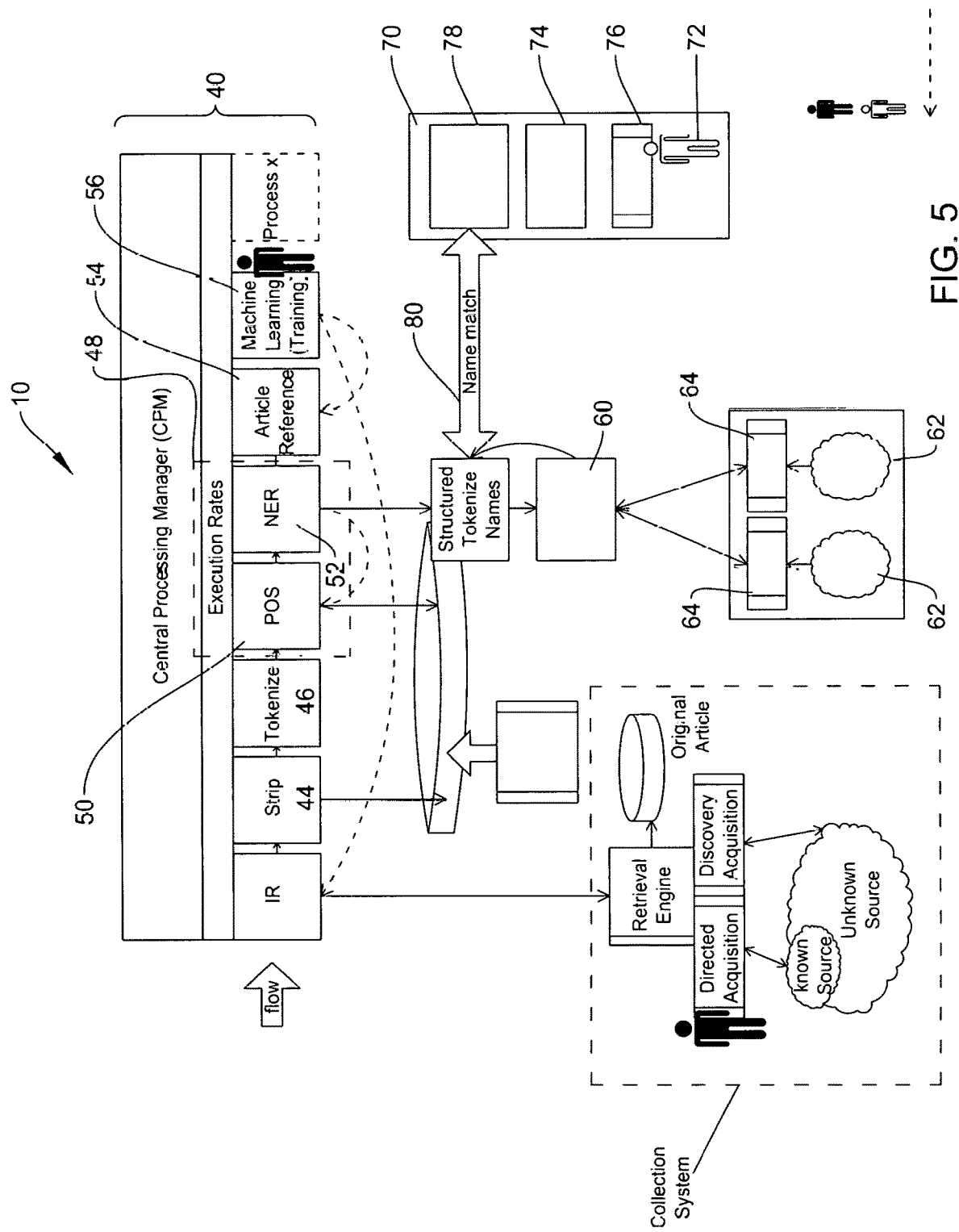
FIG. 5 is a schematic showing, generally, a decision-making analysis engine according to a preferred embodiment of the present invention.

As best shown in conjunction with FIG. 4, information retrieval may be facilitated with a data collection system 20 incorporated an external interface 22. The external interface 22 may contain three (3) user interface sections working in conjunction: an information retrieval processor 24; historical progress monitoring system 26; and a machine learning and training interface 28. The information retrieval processor (or engine) 24 provides input to all other modules of the system 10 that depend on a constant flow of information input 30. The information retrieval engine 24 drives two separate crawlers/spiders: an information directed crawler 24a, which is given specific sources and finite crawl parameters; and, an information retrieval discovery crawlers 24b, which is given limited sources (i.e., starting/ending points) and infinite crawl parameters. For purposes of the present invention, a web crawler, spider, or spider Bot should be broadly defined as any functional equivalent of an Internet bot that systematically browses the World Wide Web and provides Web indexing (web spidering).

A knowledge worker 32 may configure the information retrieval directed crawler 24a specifically for each data source 34 in an infinite crawl space 36. By way of example, and not meant as a limitation, the knowledge worker 32 may provide a starting link, such as www.listofbadguys.com/index.htm, and then may provide a crawler depth that governs the distance and behavior from such starting link. The knowledge worker 32 may further configure the information retrieval discovery crawler 24b for a broad scope starting and ending links such as, for example, www.google.com?search-badguys. The knowledge worker 32 may monitor the progress and collections activities using a real-time monitory, review or history of logs to perform quality control and sampling of the content collections 38. Through this composite information retrieval, the data 30 may be provides to the central processing manager 40 to which subsequent use and control of the data 30 may be subsequently utilized.

The central processing manager 40 performs module scheduling, thread management process control and execution rules when trigger. Scheduled triggering of the central processing manager 40 may be accomplished in either of two ways: directly and indirectly. Indirect triggering is scheduled when a data store 42 which holds process queueing information is polled from the central processing manager 40 to continuously identify tasks required to be executed. Direct triggering may be scheduled when directly requested from any remote processes. Upon direct or indirect triggering, the central processing manager processes the data 30 to strip 44, tokenize 46 and parse 48 the data chain.

The strip function 44 retrieves textual document data from the data store 42 for processing that may include removal or stripping of special characters, HTML content and other script in order to identify the plain text English language content. The tokenize function 46 identifies token logic and meta data (or inserts meta data) to identify, relate and store the document source. Additionally, the plain text English language content may be parsed 48 by splitting sentences identify the various parts of speech 50 within the content and identifying named entity recognition 52 by analyzing for noun phrases and/or proper names. For purpose of the present invention, the term English language is exemplary and not limiting, and should be broadly construed to any native language as a functional equivalent as would be apparent to those having ordinary skill in the relevant art, in light of the present teachings.

Using such various execution rules 28, once the metadata is identified and sequestered and the parts of speech and proper names identified, the identification of proper names within the data 30 may be performed with a high level of confidence, as well as whether the named entities are present in the body of the source. This will allow article relevance 54 to be determined and continuously updated and honed through machine learning 56 in order to identify, generally, a positive or negative context between the named entity and the data source item.

The data storage 42 of all structured, tokenized names and data sources is store and maintained for matching as needed. External data source gateways 60 may further provide access to various external data sources 62 and pass-through processes 64. The gateway 60 may allow access to queried information from such eternal data sources 62 or processes 64, such as, for example, proprietary third-party identity databases that allow for identification of users.

Customer informational retrieval 70 allows for an external customer 72 to request a name verification request 74 from a customer input 76. Structured client names or variations 78 may thereby be matched 80 against the stored structured, tokenized name data 82.

Predictive risk analysis is based on the sentiment scores of all collected relevant information as determined first by the ONTO algorithm, and then if necessary Rafsky-Burdulia-Saleh algorithm for further refinement, as discussed above. As indicated above, common functions shared with all of these areas include access control list (ACL), authentication, schedule, notification, logging, error trapping, data access layer, and auditing. An access control list (ACL) and authentication service provides access to the data stored in the data store 42 by defining what users and groups can access the object and what operations they can perform. These operations typically include read, write, and execute and other similar user management and registration.

A scheduler may be responsible for creating schedules per a request of an administrator (i.e., knowledge worker 32). Such schedules may include identification of who has responsibility for creating and maintaining schedule queues for executing projects on a First In First Out (FIFO) basis.

Notification may be provided through an API which, in turn, may be used to send messages to different destinations such as email, mobile devices, etc.

Logging of messages may be provided in database files or message queues or otherwise in a customizable log for development, testing or production. Such may be capable of integrating with third-party logging tools or custom logging mechanisms (e.g., Apache Log 4j or the like).

Error trapping or exception handling provides an infrastructure for handling exceptions in both the business layer as well as the presentation layer, and otherwise supports declarative exception handling and localizing error messages.

A data access layer may further provide a framework to access backend data stores without being exposed directly to the databases.

Finally, the capability to capture audit information may be provide for various activities done by the end user. Such audit information may further be stored in the database 42.

2. Operation of the Preferred Embodiment

In operation, the present invention provides a system and method for enhancing data that may be collected through electronic and online sources and subsequently augmented for enhanced use in identification and/or other decision-making activity. Data collection may be implemented through crawlers/spiders in which a web crawler, spider, or spider Bot systematically browses the World Wide Web and provides Web indexing (web spidering). Either collected continuously or in response to specific sources and finite crawl parameters, the collected ed data is subsequently augmented by a central processing manager that processes the data to strip, tokenize, and parse the data chain to retrieve textual document data from by removal or stripping of special characters, HTML content and other script in order to identify the plain text language content. The plain text language content is then parsed by splitting sentences identify the various parts of speech within the content and identifying named entity recognition 52 by analyzing for noun phrases and/or proper names. Such augmented, parsed data may further be tokenized in order to identify token logic and meta data (or inserts meta data) to identify, relate and store the document source.

In the identification and sequestration of the parts of speech and proper names within the data, correction and context may be generated as to whether a named entity is present in the body of the source, as well as the context associated with the named entity (i.e., "positive", "negative" or "neutral"). The source of the data may further be characterized (i.e., a known or credible source or not).

The volume of references, sources of data, and characterization may finally all be utilized in order to enhance decision-making by making a determination as to the quality and quantity of collected data. And, both the quality and the quantity may be continuously updated and honed through machine learning in order to further identify positive or negative context between the named entity and the data source item, and character of the data source itself.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical,* 520 US 17 (1997) or *Festo Corp. v. Shoketsu Kinzoku Kogyo Kabushiki Co.,* 535 U.S. 722 (2002), or other similar caselaw or subsequent precedent should not be made if any future claims are added or amended subsequent to this Patent Application.

We claim:

1. A method of enhancing collected online data comprising:
   determine a quality level of an online sourced document;
   generating a context between the online sourced document and a related named entity;
   saving the context between the document and the related named entity;
   generating a credibility level of the document; and
   continuously updating the quality level through machine learning.

2. The method of claim 1, wherein the collected online data is saved and updated at a frequency learned through the machine learning.

3. The method of claim 1, further comprising:
   searching the Web for a selection of actual real-world events following an identified pattern of identity abuse;
   biasing of the selection based on uniqueness of names and related ancillary information;
   extracting basic facts on within the selection; and
   collecting all the person-names and basic facts from the actual real-world events.

4. The method of claim 1, wherein the generating a context includes a method comprising:
   identifying a database of known fraud cases assembled from corporate records and including commercial entity names;
   modifying the basic facts by removing specific proper nouns; and
   matching the commercial entity names with names and concepts in the modified basic facts.

* * * * *